United States Patent [19]

Miller

[11] 4,023,941

[45] May 17, 1977

[54] GAS DESORPTION FROM LIQUIDS

[75] Inventor: Donald Stuart Miller, Olney, England

[73] Assignee: The British Hydromechanics Research Association, United Kingdom

[22] Filed: Jan. 28, 1976

[21] Appl. No.: 653,034

Related U.S. Application Data

[63] Continuation-in-part of Ser. No. 462,854, April 22, 1974, abandoned.

[52] U.S. Cl. .................................. 55/169; 55/191; 55/192; 55/203
[51] Int. Cl.² ........................................ B01D 19/00
[58] Field of Search ............... 55/41, 169, 189–195, 55/203; 209/170; 210/44, 220, 221; 261/77, 124, DIG. 75

[56] References Cited

UNITED STATES PATENTS

| | | | |
|---|---|---|---|
| 708,058 | 9/1902 | Martinson | 261/77 |
| 1,529,884 | 3/1925 | Hall | 55/190 |
| 1,554,138 | 9/1925 | Sobennikoff | 55/192 |
| 1,754,722 | 4/1930 | Lucke | 55/190 X |
| 2,488,086 | 11/1949 | Kellogg | 55/203 X |

FOREIGN PATENTS OR APPLICATIONS 669,102  11/1929  France .............................. 55/190

*Primary Examiner*—Frank A. Spear, Jr.
*Assistant Examiner*—Richard W. Burks
*Attorney, Agent, or Firm*—Leydig, Voit, Osann, Mayer & Holt, Ltd.

[57] ABSTRACT

Apparatus for desorbing gas from a liquid comprises a deflector for imparting a helical movement to the liquid, a nozzle forming the outlet of the deflector, a stepped desorption tube extending upwardly from the nozzle and a receptacle enclosing the outlet end of the desorption tube. A vacuum pump is connected to the receptacle to reduce pressure within the receptacle and feed and extraction pumps are respectively connected to the deflector and the receptacle to pass the liquid through the desorption tube and to remove de-gassed liquid from the receptacle. The desorption tube has an inlet end with a larger cross-sectional area than the outlet of the nozzle and a cross-section which increases stepwise along the length of the desorption tube. Liquid issues from the nozzle in the form of a divergent jet which extends radially outwards into contact with successive sections of the desorption tube which are bounded by a stepwise change in cross-sectional area to thereby seal totally enclosed spaces between the jet and said sections of the desorption tube.

7 Claims, 6 Drawing Figures

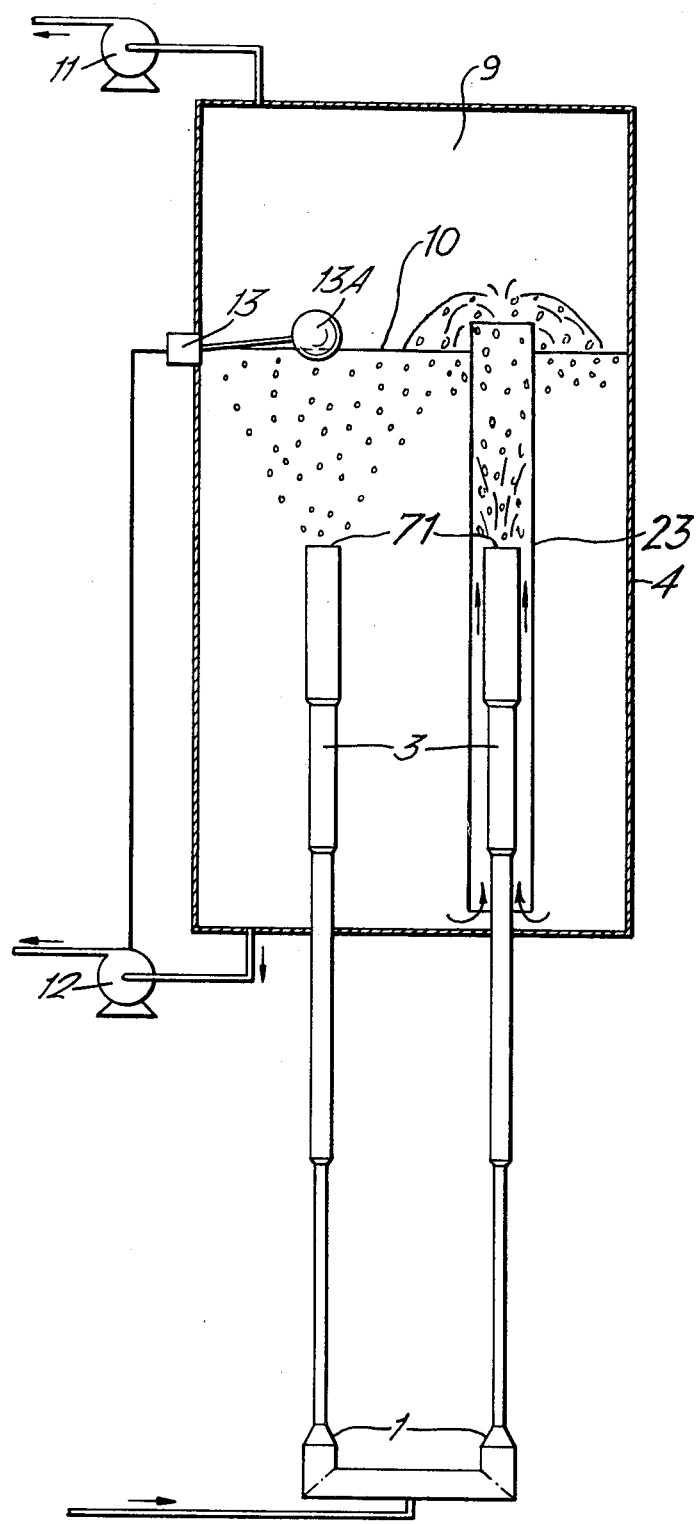
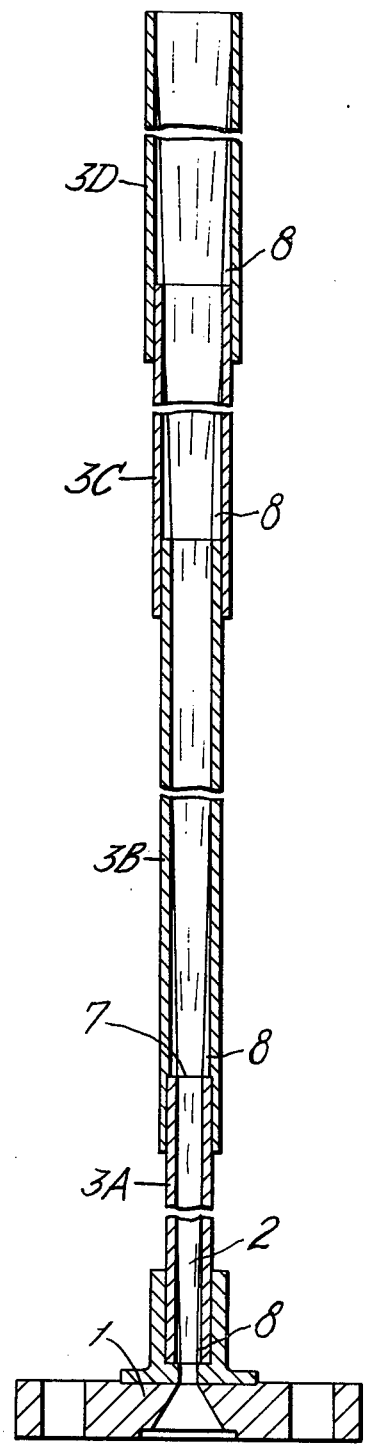
FIG. 1.
FIG. 2.

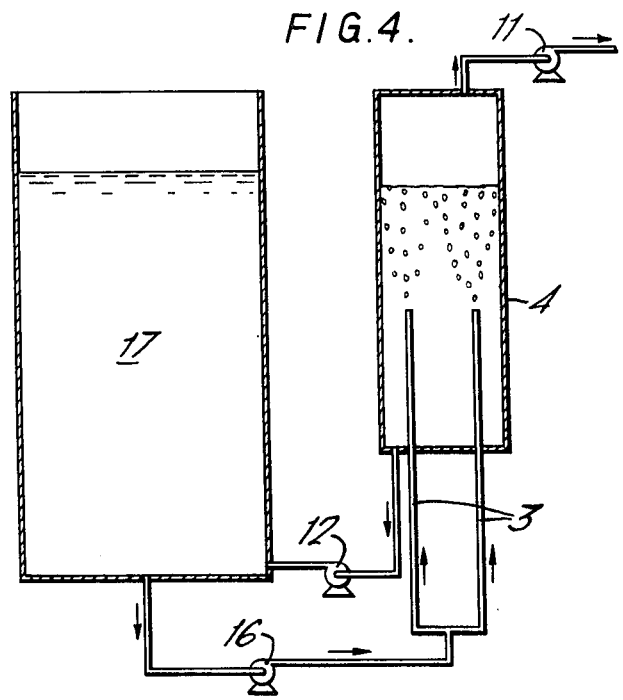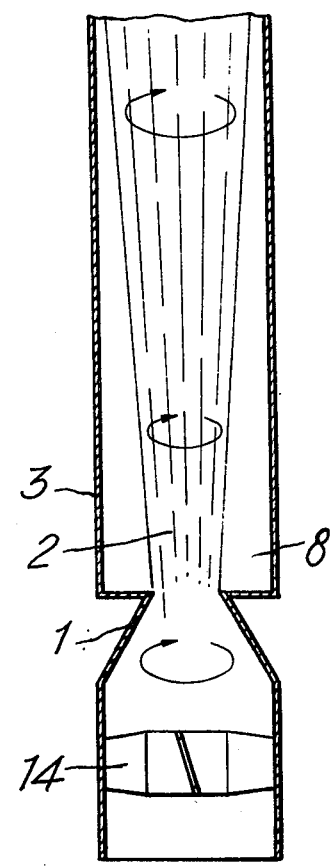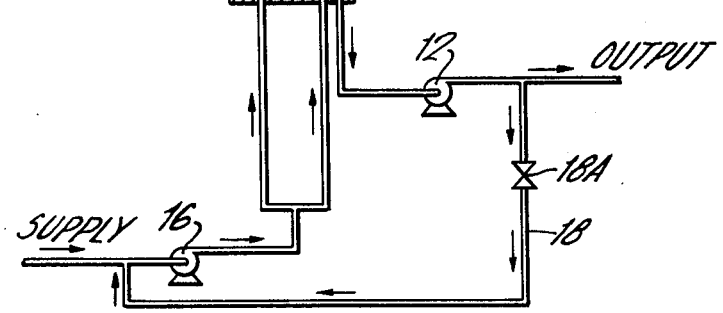

GAS DESORPTION FROM LIQUIDS

BACKGROUND OF THE INVENTION

This application is a continuation-in-part application of application Ser. No. 462,854, filed Apr. 22, 1974 and now abandoned; and relates to gas desorption apparatus for desorbing gas from a liquid, and to separating means, including such gas desorption apparatus, for removing gas from a liquid.

To achieve high rates of desorption of gas from a liquid, it is necessary to lower the pressure of the liquid to a pressure approaching the vapour pressure of the liquid. Extracting the released gas at pressures approaching the vapour pressure of the liquid usually requires complex and expensive extraction equipment.

SUMMARY OF THE INVENTION

An object of the present invention is to provide means for desorbing gas from a liquid in such a way that the released gas may be readily collected and extracted using simple equipment.

According to the invention there is provided gas desorption apparatus for desorbing gas from liquid, comprising deflector means for imparting a helical movement to the liquid; a nozzle forming the outlet of the deflector means, for converting pressure energy of the liquid to kinetic energy; a stepped desorption tube extending upwardly from the nozzle, having an inlet end with a larger cross-sectional area than the outlet of the nozzle and a cross-sectional area which increases stepwise along the length of the desorption tube; pump means for passing liquid through the desorption tube in a jet which, in each section of tube bounded by stepwise change in cross-sectional area, diverges into contact with the entire periphery of said section of the desorption tube to thereby seal a totally enclosed space between the jet and said section of the desorption tube; a receptacle enclosing the outlet of the desorption tube for receiving fluid from the desorption tube; and control means for maintaining the amount of liquid in the receptacle so that the liquid has a free surface disposed above the outlet of the desorption tube.

When liquid is passed through the nozzle, the resultant jet rapidly evacuates the space between the jet and the adjacent portion of the desorption tube, thereby lowering the pressure in this space surrounding the jet. As a result of this reduction in pressure, there is also a reduction in the pressure of the liquid forming the jet, and gases dissolved in this liquid are released. A similar phenomenon takes place in each of the elongate sections of the desorption tube.

The centrifugal force produced as a result of the helical movement imparted to the liquid passed through the desorption tube causes the jet to diverge into contact with the entire internal periphery of each elongate portion of the desorption tube near the outlet end of said portion. One convenient form of deflector means suitable for this purpose comprises swirl vanes mounted upstream of the nozzle.

The pump means normally comprises a feed pump for pressurizing liquid passed through the desorption tube and an extraction pump, for removing de-gassed liquid from the receptacle, which also assists in the formation of the necessary jet. Moreover, a single pump used for extraction and feed may constitute the sole pump means for the formation of the jet.

During operation of the apparatus, there is a reduction of pressure in the liquid, assisting desorption of dissolved gas from the liquid. The mixing and turbulence in that region of the jet where the outer surface of the jet contacts the entire periphery of the outlet end of each section of the desorption tube results in the withdrawal of air from the space between the outer surface of the jet and the inner surface of the upstream end of said portion of the desorption tube. This further assists the desorption of dissolved gas from the liquid. The fluid flowing into the receptacle therefore consists of a mixture of a liquid and entrained bubbles of gas which are in a form convenient for separation from the liquid.

Separation of gas bubbles from the liquid may be effected by ensuring that the liquid in the receptacle has a free surface and connecting vacuum suction means to the gas space above the free surface. Alternatively, liquid may be fed from the receptacle to conventional gas separation means including vortex separators.

In cases where gas is low, or where few nucleation particles are present in the liquid, it may be necessary to seed, or assist the desorption process by the injection of gas, or particles, near the inlet end of the desorption tube.

In application where a high level of gas removal is required, the liquid may be heated or subjected to a greater pressure drop through the nozzle and the desorption tube. Alternatively, provision may be made to return a proportion of the de-gassed liquid leaving the apparatus, to be mixed with the supply liquid, in order to lower the percentage dissolved-gas-content of the liquid entering the apparatus, the liquid may be passed several times through the apparatus, or the liquid may flow through successive gas desorption apparatuses according to the present invention.

DESCRIPTION OF THE DRAWINGS

Different examples of gas desorption apparatus according to the invention are hereinafter described, by way of example only, with reference to the accompanying drawings, in which:

FIG. 1 is a schematic view of a preferred form of gas desorption apparatus according to the invention;

FIG. 2 is an elevation of a desorption tube consisting of four axially aligned tubes suitable for use in the apparatus shown in FIG. 1;

FIG. 3 is a sectional view of the inlet end of a desorption tube, showing deflector means and a nozzle suitable for use in the apparatus shown in FIG. 1; and FIGS. 4 to 6 are schematic views of three different forms of gas separators incorporating gas desorption apparatus according to the invention.

DESCRIPTION OF PREFERRED EMBODIMENTS

Figure 6:
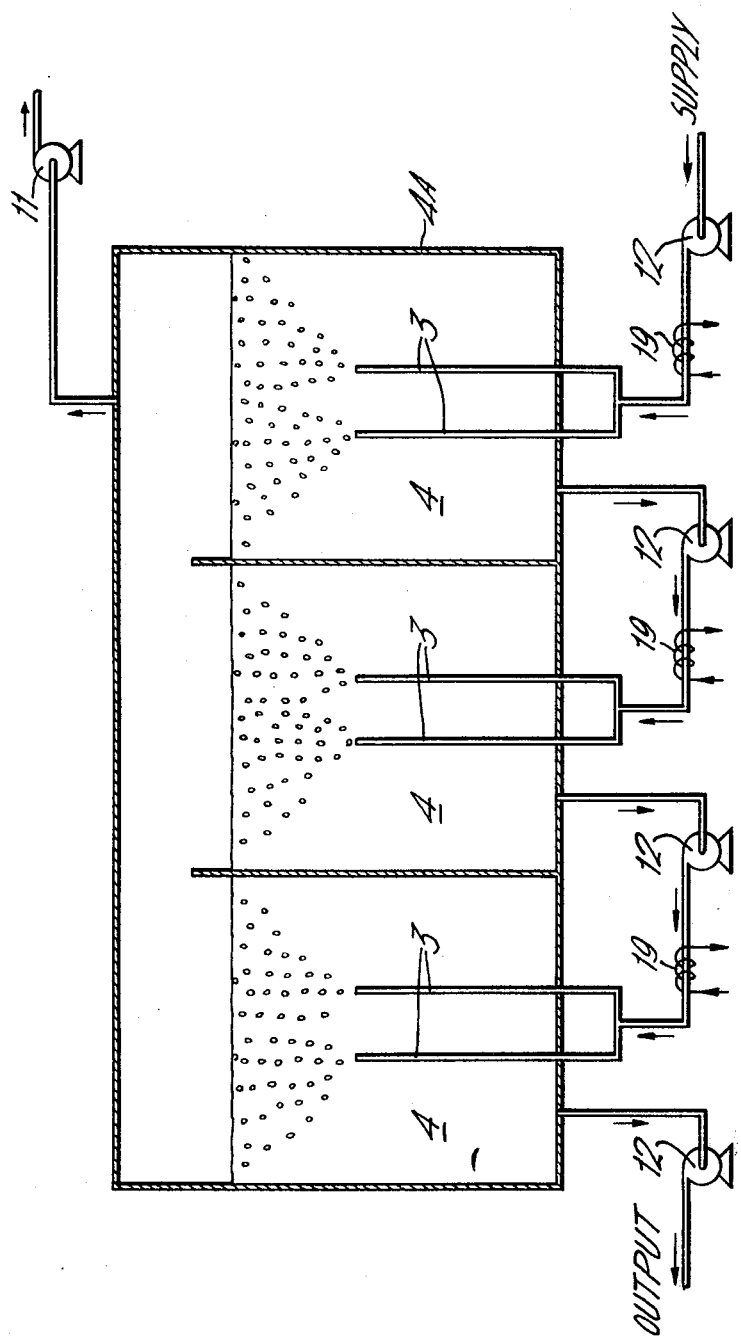

As shown in FIG. 1, liquid containing dissolved gas is supplied to four desorption tubes 3 (only two of which are shown), of the type shown in FIG. 2, which project vertically upwards into a cylindrical receptacle 4. The liquid surface 10 is maintained between upper and lower predetermined limits by a sensor 13 actuated by a float 13A controlling the flow rate through an extraction pump 12 so that the receptacle 4 is approximately two thirds full, but the rate of extraction of liquid from the receptacle 4 must not be so high as to cause bubbles of liberated gas to be drawn down into the inlet of the extraction pump 12. In such an arrangement, each desorption tube 3 may extend into the receptacle 4, typically by about one third of the height of the receptacle 4, to assist in providing a volume of de-gassed, bubble-free liquid for extraction from the receptacle 4. The bubbles of dissolved gas released from the submerged ends of the desorption tubes 3 are discharged with a vertical upward motion which together with their natural bouyancy ensures their passage to the surface 10 where they burst. In order to avoid excessive turbulence within the receptacle 4, a tubular skirt member 23 (only one of which is shown) may be mounted co-axially around the upper end of each desorption tube 3 so as to project above the end 71 of the desorption tube. Liquid from the recetacle 4 flowing into the lower end of the skirt member 23 is thus entrained with liquid issuing from the desorption tube and the combined flow from the upper end of the skirt member 23 wells gently over the upper end of the skirt member 23. The liberated gas is removed from the space 9 enclosed above the liquid surface 10 in the receptacle 4 by vacuum suction means 11. Using a number of desorption tubes 3 within a single vessel enables compact units to be built having a high throughput.

As shown in FIG. 2 each desorption tube 3 is made up of four elongate tubular sections 3A, 3B, 3C and 3D accurately aligned along the nozzle axis. The sections 3A, 3B, 3C and 3D each have a uniform cross-section, but are arranged so that there is an abrupt increase in internal cross-section between successive sections. During operation, a jet 2 of liquid issuing from a nozzle 1 having a convergent orifice at the inlet end of the first section 3A diverges because of the desorption of dissolved gas as a result of reduction in pressure of the liquid forming the jet 2. The length of each section 3A, 3B, 3C and 3D is such that the jet 2 of liquid issuing from a nozzle 1 at the inlet end of the first section 3A will expand into contact with the entire internal periphery of part of the outlet end 7 of this section 3A and the jet of liquid issuing from the first three sections 3A, 3B, 3C will expand into contact with the entire internal peripheries of the subsequent or downstream sections 3B, 3C and 3D. In each case, a, space 8 between the jet 2 and the surrounding section 3A, 3B, 3C and 3D is sealed so as to allow the space 8 to be rapidly reduced in pressure to a pressure approaching the vapour pressure of the liquid. This reduction in pressure causes rapid and extensive desorption of gases in the liquid jet 2. The liquid flowing through the receptacle 4 therefore contains gas bubbles which are in a form which is suitable for separation from the liquid.

As shown in FIG. 3, deflector means disposed upstream of the nozzle 1 include swirl vanes 14 which impart a rotary component to the motion of the liquid of the jet 2 and the resultant centrifugal force acting on the liquid causes the jet 2 to diverge more rapidly and so facilitates the formation of a liquid seal between the jet 2 and the desorption tube 3.

As shown in FIG. 4, liquid from a supply tank 17 is passed through a gas desorption apparatus of the type shown in FIG. 1 and is discharged back into the supply tank 17. The dissolved gas content of the batch of liquid in the tank 17 will steadily fall. In practice, it has been found possible to lower the dissolved oxygen content of cold water (at 12° C), stored in an open tank, to under 0.3 p.p.m. (parts per million) using a nozzle supply pressure of 40 p.s.i. the dissolved gas being removed by a simple liquid ring vaccum pump 11 maintaining a modest vacuum of 35 mm of mercury in the receptacle 4.

As shown in FIG. 5, liquid is passed through a gas desorption apparatus of the type shown in FIG. 1 in which a proportion of the flow from the extraction pump 12 is returned via valve controlled by-pass line 18 and mixed with the water supplied to the feed pump 16. The dissolved gas content of the liquid output can then be controlled by varying the proportion of flow returned by valve 18A in the by-pass line 18, for recycling. At nozzle pressure of 50 p.s.i., with a supply of cold water containing 9 p.p.m. of dissolved oxygen, the output flow has a dissolved oxygen content of 0.65 p.p.m. with zero recycle, falling to 0.5 p.p.m. at 80 p.s.i. nozzle pressure.

As shown in FIG. 6, liquid is passed successively through three gas desorption apparatuses of the type shown in the FIG. 1. In this case, the receptacles 4 are all enclosed within a common housing 4A so that only one vacuum pump is required. Using a pressure of 40 p.s.i., at each of the nozzles, and zero recycle, with a supply of cold water (at 12° C) containing 8 p.p.m. of dissolved oxygen, the outlet water had a dissolved oxygen content of 0.35 p.p.m. Heating means, shown schematically as a heat exchanger coil 19, may be provided to heat the liquid fed to the nozzles of each gas desorption apparatus to improve de-gassing performance.

Increasing the nozzle supply pressure in any of the gas desorption apparatuses disclosed gives both an increase in throughput of liquid and an increase in the precentage of dissolved gas removed from the liquid.

I claim:
1. Gas desorption apparatus for desorbing gas from a liquid, comprising, in combination, a stepped desorption tube extending upwardly, having an inlet end and an outlet end for the liquid respectively at the bottom and top of the tube, the tube comprising several elongated sections each having a different cross-sectional area, so that the cross-sectional area of the desorption tube increases stepwise upwardly along its length with the outlet end being of greater cross-sectional area than the inlet end; a nozzle opening into the inlet end of the desorption tube; pump means for pressurizing the liquid ahead of the nozzle, the nozzle serving to direct the pressurized liquid axially into the desorption tube in the form of a jet; deflector means interposed immediately ahead of the nozzle for imparting a helical motion to the liquid, so that upon entering each section of the tube, the jet diverges into contact with the inner wall of such section thereby to define and to seal a totally enclosed annular space of reduced pressure between the jet and said section of the desorption tube to encourage the gas in the liquid to emerge therefrom in the form of entrained bubbles; a receptacle enclosing the outlet end of the desorption tube for receiving liquid from the desorption tube; and means for maintaining the level of liquid in the receptacle below the top of the receptacle yet adequate to keep the output end of the desorption tube submerged so that the liquid has a free surface disposed above the outlet end of the desorption tube for freeing of bubbles of gas into the space above the free surface of the liquid.

2. Gas desorption apparatus according to claim 1, in which the control means are operable to maintain the height of the free surface of the liquid at about two thirds of the height of the receptacle to provide an air space for acceptance of the desorbed gas.

3. Gas desorption apparatus according to claim 2, in which the desorption tube extends into the receptacle by about one third of the height of the receptacle, so that the degassed liquid in the bottom of the receptacle is bubble free and unagitated before it is removed.

4. Gas desorption apparatus according to claim 1, in which a tubular skirt member is mounted co-axially around the upper end of the desorption tube and separated therefrom to provide an annular flow space, the skirt member projecting above the upper end of the desorption tube to reduce agitation in the liquid which is in the receptacle.

5. Gas desorption apparatus according to claim 1, in which vacuum suction means are connected to the receptacle to remove gas from the space above the free surface of liquid fed to the receptacle.

6. Gas desorption apparatus according to claim 1, including an extraction pump for removing degassed liquid from the receptacle.

7. Gas desorption apparatus according to claim 6, with means at the outlet of the extraction pump for directing at least part of the removed liquid to the deflector means and the nozzle, thereby to recycle the liquid.

* * * * *